United States Patent [19]

Hooper et al.

[11] Patent Number: 4,488,663

[45] Date of Patent: Dec. 18, 1984

[54] SELF-CHARGING METERING AND DISPENSING DEVICE FOR FLUIDS

[75] Inventors: Sonne L. Hooper, Seabrook; Drel Setzer, Bellaire, both of Tex.

[73] Assignee: The United States of America as represented by the Administrator of the National Aeronautics and Space Administration, Washington, D.C.

[21] Appl. No.: 425,205

[22] Filed: Sep. 28, 1982
(Under 37 CFR 1.47)

[51] Int. Cl.³ ............................................. G01F 11/06
[52] U.S. Cl. ......................................... 222/43; 222/48;
222/309; 222/340
[58] Field of Search ............... 222/47, 48, 71, 72, 222/250, 282, 309, 318, 335, 336, 41, 43, 44, 291, 340; 604/208–211, 246, 249

[56] References Cited

U.S. PATENT DOCUMENTS

| | | | |
|---|---|---|---|
| 2,605,763 | 8/1952 | Smoot | 222/43 X |
| 3,194,448 | 7/1965 | Theall | 222/335 |
| 3,491,920 | 1/1970 | Racki et al. | 222/335 |
| 3,830,410 | 8/1974 | Magrath et al. | 222/309 |

FOREIGN PATENT DOCUMENTS 244946  5/1963  Australia ............................ 222/309

*Primary Examiner*—Joseph J. Rolla
*Assistant Examiner*—Kevin P. Shaver
*Attorney, Agent, or Firm*—Russell E. Schlorff; John R. Manning; Marvin F. Matthews

[57] ABSTRACT

A novel self-metering and dispensing device for fluids obtained from a pressurized fluid supply is provided. Tubing and valving means permit the introduction of fluid into and discharge from a closed cylindrical reservoir. The reservoir contains a slideably disposed piston coacting with a coil compression spring, piston travel determining the amount of fluid in the reservoir. Once the determined amount of fluid is introduced into the reservoir, the fluid is discharged by the force of the coil compression spring acting upon the piston.

2 Claims, 2 Drawing Figures

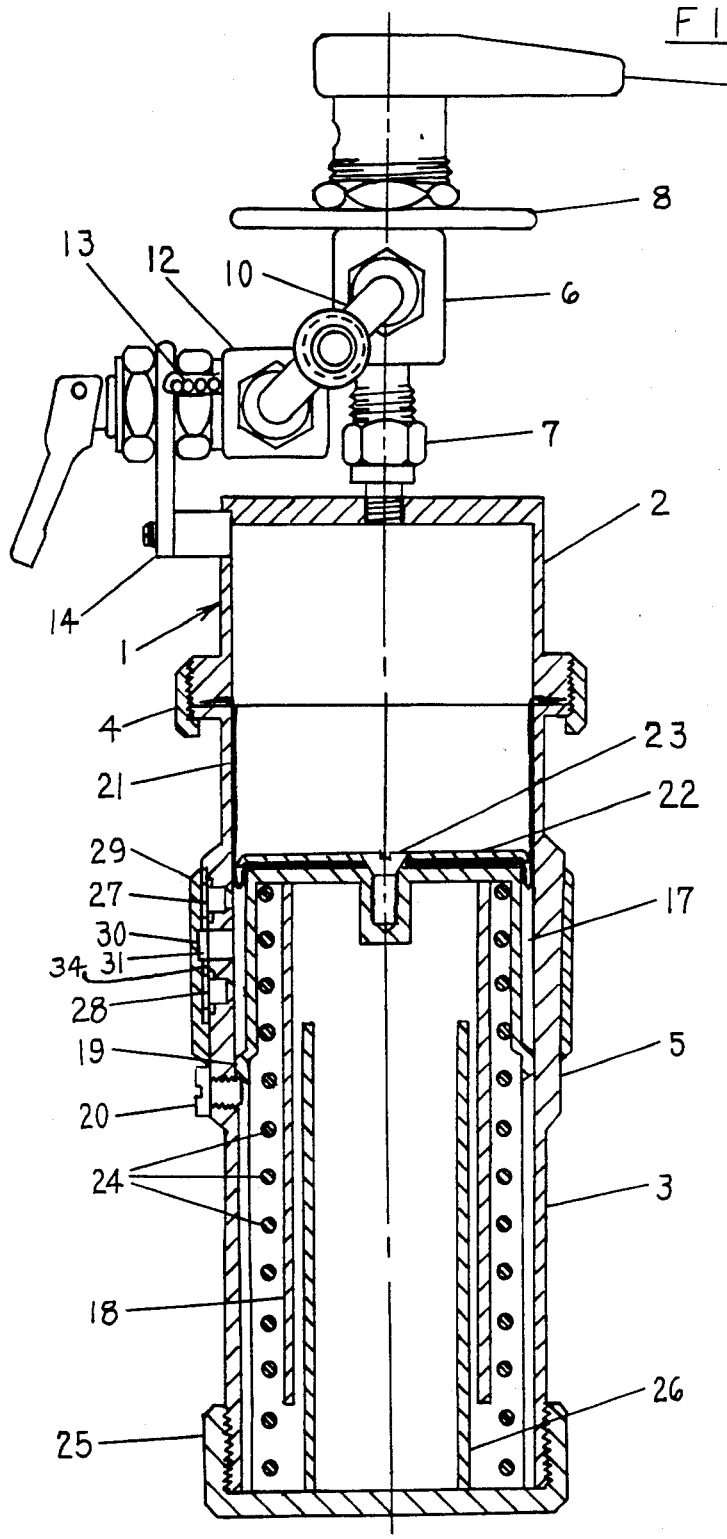

SELF-CHARGING METERING AND DISPENSING DEVICE FOR FLUIDS

DESCRIPTION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

TECHNICAL FIELD

This invention relates to a self-charging metering and dispensing device for fluids. More particularly, this invention relates to such a device into which a measured amount of fluid can be introduced from a pressurized fluid supply and the fluid subsequently pressure discharged from said device.

BACKGROUND ART

The prior art discloses a number of devices for dispensing measured amounts of fluids. The use of a cylinder slideably disposed in a reservoir as a means of measuring the amount of product to be dispensed is well known as exemplified by U.S. Pat. No. 2,682,357. The art also discloses discharging fluids from such a device using externally applied force to cause piston travel to discharge the fluid content of the device. This is seen in U.S. Pat. No. 4,250,934. While there is no question as to the operability of the prior art devices for the principal purposes intended, what is needed is a device that minimizes manipulative activities on the part of the user, particularly any required use of force on the part of the user, a device that is simple in construction, a device that requires no separate external, electrical or mechanical, source of operating power to discharge the fluid content.

STATEMENT OF THE INVENTION

While the device of this invention has many applications, a brief discussion of a particular application will facilitate a better understanding and appreciation of its meritorious features.

Food for crewmen on extended space flights is usually packaged in single service dehydrated form. Prior to consumption, the food must be rehydrated by adding a measured amount of water. Under conditions of zero-gravity, a measuring cup would have little utility. To further complicate matters, the water supply in space vehicles, such as the Space Shuttle, is contained and maintained at a pressure of 20 psi (138 kilopascals). What is required is a simple device capable of measuring a predetermined amount of water from a pressurized source of water and then discharging that amount of water into the desired container, all with minimum effort on the part of the crewman and, preferably, without any demand on the power supply of the space vehicle.

The novel self-metering and dispensing device of this invention comprises, in combination, a valving section, a metering section and a power section. The body of the unit, the metering section, is a closed cylindrical reservoir. The top of the reservoir is fitted with a valving means to which is connected at least one tube permitting the flow of liquid to or from the reservoir through the valving means and tube(s). The valving means, typically a plug or ball valve, is such as to permit the flow of liquid into the reservoir, retention of the liquid under pressure in the reservoir and, subsequently, the discharge of the liquid from the reservoir through the same tube or a second tube also connected to the valving means, all as desired by the operator of the device.

The reservoir and its associated elements constitutes the principal inventive feature of the novel device. The reservoir has a piston disposed therein to slideably move from the top of the reservoir to one or more predetermined stop positions below the top, each stop position representing a known volume between the top of the piston and the top of the reservoir. Coacting with the bottom of the piston and the bottom of the reservoir is a coil compression spring. The coil spring has a compressive force less than the force of the pressurized liquid supply and is of sufficient length to maintain the piston against the top of the reservoir when it is empty. In operation, the empty device is connected to a pressurized liquid supply. The valve is adjusted to permit flow of liquid into the device. When piston travel stops, the valve is adjusted to cut off the water supply, retaining the liquid in the reservoir. The device then contains a known amount of liquid under the pressure exerted by the coil compression spring. To discharge the liquid, all that is required is that the valve be readjusted to permit the flow of liquid from the reservoir through the same inlet tube when first uncoupled from the liquid supply or, if the valving means is so equipped, through a second tube.

The device of this invention is unique in that the power system for the device is an energy storage system, taking energy from the pressurized fluid supply and then using that energy to discharge the fluid from the device. The only force or effort required on the part of the user, is that required to merely adjust the single control valve. No external electrical or mechanical power is required and the device is virtually maintenance-free.

DESCRIPTION OF DRAWINGS

FIG. 2 is a side view of the assembled device with the reservoir assembly shown in cross section and the coupling to the pressurized liquid supply omitted.

DESCRIPTION OF THE PREFERRED EMBODIMENT

Figure 1:
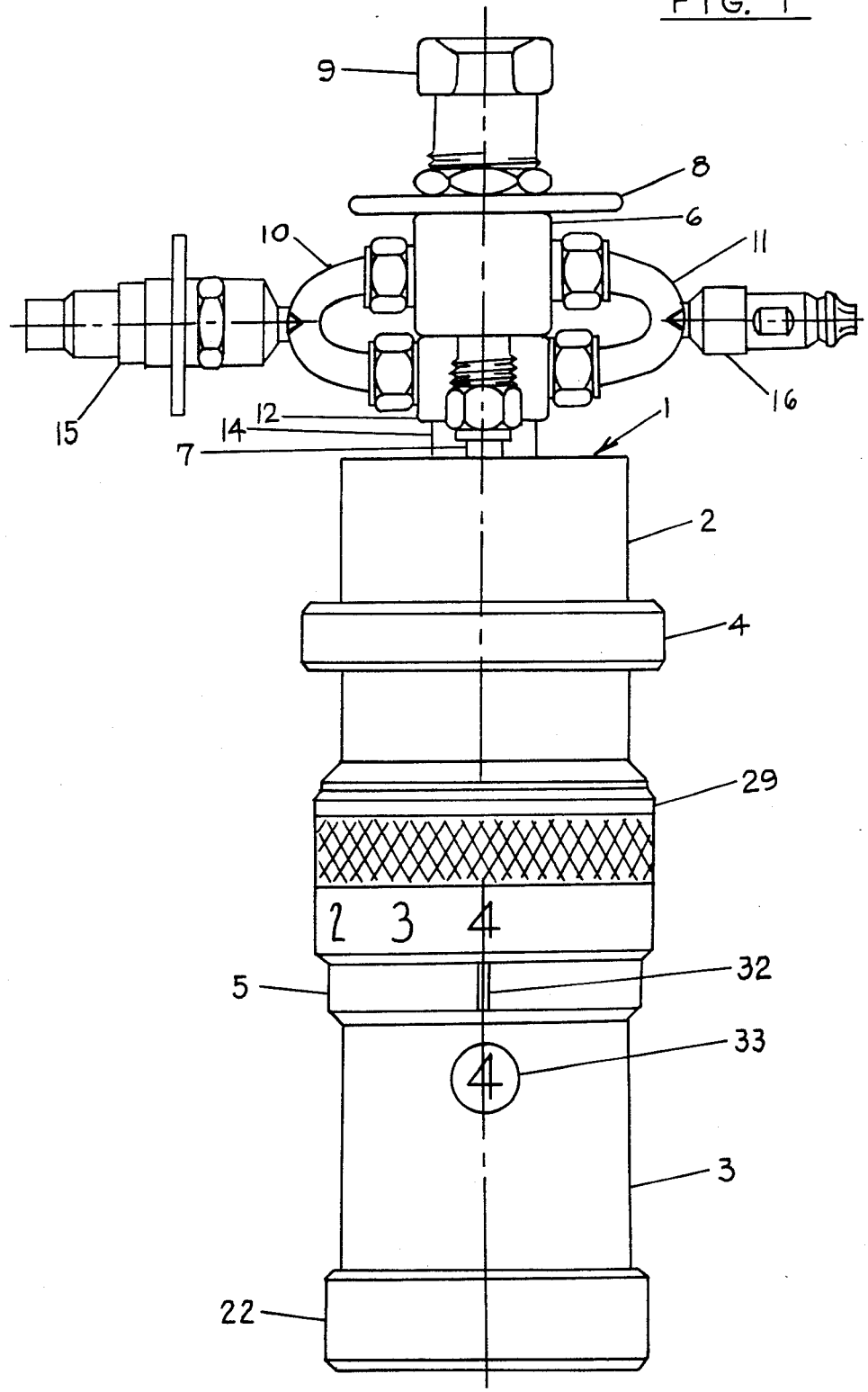
FIG. 1 is a front view of the assembled device.

The preferred embodiment of this invention is a device for rehydrating food under zero-gravity conditions encountered during space flight. The water supply was maintained at 20 psi (138 kilopascals). Since the required coupling to the water supply was different than that required for discharge, for convenience, an inlet tube and a separate discharge tube was provided. In actual size, the device is approximately 3 inches (7.5 cm) in diameter and 9 inches (22.5 cm) long.

Referring to the drawings, the closed reservoir 1 is comprised of an upper section 2 and a lower section 3, joined together by retainer ring 4. In this device, for reasons subsequently shown, the exterior wall of the reservoir is enlarged at 5. Plug valve assembly 6 is attached to the top of the reservoir through fitting 7. The valve assembly is equipped with indicator disc 8 to facilitate the positioning of valve handle 9. Also connected to the plug valve assembly is one end of U shaped inlet tube 10 and one end of U shaped discharge tube 11. The other ends of inlet tube 10 and discharge tube 11 are connected to toggle valve assembly 12, the valve being maintained in the closed position by means of compression spring 13. The rigidity and positioning of toggle valve assembly is maintained by bracket 14. The plug valve itself is conventional and can be positioned to permit water to flow through the inlet tube into the reservoir, positioned to close the reservoir maintaining the water therein or positioned to permit the water to flow from the reservoir through the discharge tube or the inlet tube.

The inlet tube 10 and discharge tube 11 are fitted with coupling assemblies 15 and 16 respectively. The type of coupling assemblies employed can be varied to meet the desired needs and form no part of this invention. In the device shown, coupling 15 is a conventional quick disconnect type commonly employed in space systems permitting the device to be quickly and simply attached to or detached from a pressurized water supply. Coupling 16 was designed to accept a hollow needle fitting permitting the puncture of a hole in a sealed package of dehydrated food and the discharge of water from the reservoir into the package of food.

The piston 17 with attached cylindrical guide 18 is disposed within the reservoir 1 slideably moveable from the top of the reservoir to the lower most position where the protuberance 19 of the piston contacts screw 20. The piston assembly includes a rolling elastomer seal 21, in this case a rolling rubber seal, attached to the piston 17 by means of plate 22 and screw 23. The rubber seal 21 is held in place by clamping between the upper 2 and lower 3 sections of the reservoir 1. Other types of seals can be employed.

Coil compression spring 24 is disposed within the reservoir 1 to coact with the piston and the bottom cap 25 of the reservoir. When empty, the spring will maintain the piston against the top of the reservoir 1. The bottom cap 25 includes cylindrical guide 26 to coact with piston guide 18 to maintain alignment of piston 17.

The coil compression spring 24 must have a compressive force of less than that exerted by the pressurized water supply. Preferably, the compression spring 24 is rather long, having a relatively constant compressive force over its entire range of expansion and contraction. In this particular device, the spring had a compressive force of approximately 45 lbs. (20 kg), discharging fluid at a pressure of 15 psi (103 kilopascals).

The device as shown incorporates a useful and convenient bypass of the reservoir for obtaining unmetered quantities of fluid from the pressurized fluid supply. With the plug valve adjusted to the off position, that is, no fluid being able to flow into or out of the reservoir, and inlet tube 10 coupled to the pressurized fluid supply, any desired quantity of fluid can be discharged through outlet tube 11 by merely depressing (opening) the toggle valve handle of toggle valve assembly 12.

For Space Shuttle application, it was desired that the device have the capability of metering water in the quantities of 2 ounces (59 ml), 3 ounces (89 ml), and 4 ounces (118 ml). In the device shown, the lowest piston position provided a volume of water of 4 ounces (118 ml). For lesser quantities, buttons 27 and 28 were provided, retained in place by rotatable ring 29. The ends of the buttons extending into the reservoir were slightly tapered. The rotatable ring 29 has cavities 34 such that when a cavity is positioned over a button 27 or 28, the button is slideably forced into the cavity by the movement of the piston, thereby not affecting any movement of the piston. Positioning the ring 29 so that no cavity is over the button, positions the button so that its end portion extends into and is held in place inside the reservoir, stopping the downward movement of the piston by contact between the button, 27 or 28, and the protuberance 19 of the piston. The positioning of the ring to actuate the desired button is accomplished by a detent 30 in the ring coacting with a leaf spring stop 31 affixed to the outer wall of the reservoir. Actuating the top button 27, will provide 2 ounces (59 ml) of water, while the button 28 will provide 3 ounces (89 ml) of water.

In this particular device, to facilitate the proper positioning of rotatable ring 29, the ring was marked with the numerals 2, 3 and 4, which numerals, when positioned over guide line 32, indicated the volume the reservoir was set to retain. As further visual evidence of the volume of liquid in the reservoir, hole 33 was provided in the lower section 3 of the reservoir to permit viewing the numerals 2, 3 or 4 marked on the cylindrical guide 18, which numerals, when positioned at the hole 33, indicated the volume of liquid in the reservoir.

The device as shown involved the use of a separate inlet tube and a separate discharge tube with appropriate valving means to connect either to the reservoir. Obviously, such a device could have but a single tube used for both filling and discharging the reservoir. Similarly, more than one discharge tube with associated valving means could also be used.

While the device has particular application in metering and dispensing water or other liquids under the zero gravity condition encountered in outer space, many applications under ambient conditions on earth are readily apparent. The device permits metering a quantity of fluid from a pressurized fluid supply, followed by the pressurized discharge of that fluid where and when desired. The device is totally portable and the device itself operates without any external power source, the required discharge pressure being initially provided by the water supply pressure, the pressure being captured and stored in the device for later use at discharge.

What is claimed is:

1. In a self-charging metering and dispensing device for fluids obtained from a pressurized fluid supply comprising, in combination, a closed cylindrical reservoir fitted with at least one tube and associated valving means permitting the introduction of fluid into the reservoir, the retention of the fluid in the reservoir and subsequent discharge of said fluid from said reservoir, the improvement in said reservoir which comprises a piston in said reservoir disposed to slideably move from the top of said reservoir to a predetermined point below the top of said reservoir, a coil compression spring having a compressive force of less than that exerted by the pressurized fluid supply disposed in said reservoir and coacting with said piston and the bottom region of said reservoir to maintain the piston at the top of the reservoir when empty of fluid and permitting the piston to be displaced downward against the compressive force of the spring with the introduction of fluid from the pressurized fluid supply, the coil compressing spring having a compressive force that is substantially constant throughout the operable movement of the coil compression spring within the reservoir, a rolling elastomer seal to provide a fluid-tight contact between the piston and the wall of the reservoir, means for stopping the downward movement of the piston at predetermined positions of the piston within said reservoir, said means for stopping the downward moveiment comprises, in combination, at least one button slidably disposed through the wall of the reservoir, a rotatable retainer ring affixed to said reservoir and coacting with said button to maintain the button firmly positioned and extending into the reservoir to coact with the piston to stop the downward movement of the piston, said retainer ring containing at least one cavity which when positioned over the button permits the button to be slidably moved into said cavity by coaction with the piston permitting the continued downward movement of the piston.

2. The device of claim 1 wherein the reservoir is fitted with a first inlet tube and a second outlet tube and associated valving means permitting the introduction of fluid into the reservoir through the inlet tube, the retention of fluid in the reservoir and the discharge of fluid through the outlet tube and wherein said inlet and outlet tubes are connected with a separate tube having a separate valving means disposed in said separate tube permitting the flow of fluid from the pressurized fluid supply through the inlet tube, said separate valving means and the outlet tube thereby bypassing said reservoir.

* * * * *